(12) United States Patent
Tanio

(10) Patent No.: US 7,862,448 B2
(45) Date of Patent: Jan. 4, 2011

(54) SPORTS EQUIPMENT

(75) Inventor: Yoshiyuki Tanio, Aichi (JP)

(73) Assignee: Right Planning Ltd., Aichi (JP)

( * ) Notice: Subject to any disclaimer, the term of this patent is extended or adjusted under 35 U.S.C. 154(b) by 0 days.

(21) Appl. No.: 12/160,229

(22) PCT Filed: Jan. 11, 2007

(86) PCT No.: PCT/JP2007/050217

§ 371 (c)(1),
(2), (4) Date: Jul. 8, 2008

(87) PCT Pub. No.: WO2007/080912

PCT Pub. Date: Jul. 19, 2007

(65) Prior Publication Data

US 2009/0011851 A1     Jan. 8, 2009

(30) Foreign Application Priority Data

Jan. 11, 2006    (JP) .......................... 2006-003922

(51) Int. Cl.
*A63B 53/10*    (2006.01)
(52) U.S. Cl. .................................... 473/319
(58) Field of Classification Search .......... 473/316–321
See application file for complete search history.

(56) References Cited

U.S. PATENT DOCUMENTS

| | | | | |
|---|---|---|---|---|
| 1,535,667 A | * | 4/1925 | Horne | 473/303 |
| 2,099,126 A | * | 11/1937 | Larsen | 156/256 |
| 3,972,529 A | * | 8/1976 | McNeil | 473/320 |
| 5,279,879 A | * | 1/1994 | Takezawa et al. | 428/110 |
| 5,294,119 A | * | 3/1994 | Vincent et al. | 473/318 |
| 5,913,734 A | * | 6/1999 | Tanaka | 473/320 |
| 6,106,413 A | * | 8/2000 | Kusumoto | 473/319 |
| 6,514,156 B1 | * | 2/2003 | Zorzi | 473/319 |
| 6,875,127 B2 | * | 4/2005 | Hasegawa | 473/319 |
| 6,935,969 B2 | * | 8/2005 | Kumamoto | 473/319 |
| 7,497,786 B2 | * | 3/2009 | Cheng | 473/320 |
| 2003/0073508 A1 | * | 4/2003 | Kumamoto | 473/319 |
| 2008/0287212 A1 | * | 11/2008 | Jung | 473/319 |

FOREIGN PATENT DOCUMENTS

| | | |
|---|---|---|
| JP | 6-269522 A | 9/1994 |
| JP | 2000-301621 A | 10/2000 |
| JP | 2001-150574 A | 6/2001 |
| JP | 2004-130564 | 4/2004 |
| WO | WO 01/97990 A2 | 12/2001 |

* cited by examiner

*Primary Examiner*—Stephen L. Blau
(74) *Attorney, Agent, or Firm*—Arent Fox LLP

(57) ABSTRACT

It is a sport equipment 2 using a partially hardened sheet form prepreg 10 formed by impregnating a reinforced fiber material 6 disposed substantially parallel with a thermal hardening resin material 7 to bind the reinforced fiber material, where the prepreg is layered so as to form a tube rod in a tapered shape having a diameter increasing from one end to the other, and the tube rod is provided with a strengthening means on a radially entire circumference to the axis direction. Herewith it is especially used for a golf club shaft, while maintaining a characteristic of light weight, securing strength equal to or greater than a steel-made golf shaft, and suppressing unnecessary deflection and vibration, so as to provide a sports equipment made of a reinforced fiber combined material such as a gold club shaft having high strength such as bending and twisting rigidity.

1 Claim, 15 Drawing Sheets

A-A Cross Section View

FIG.4
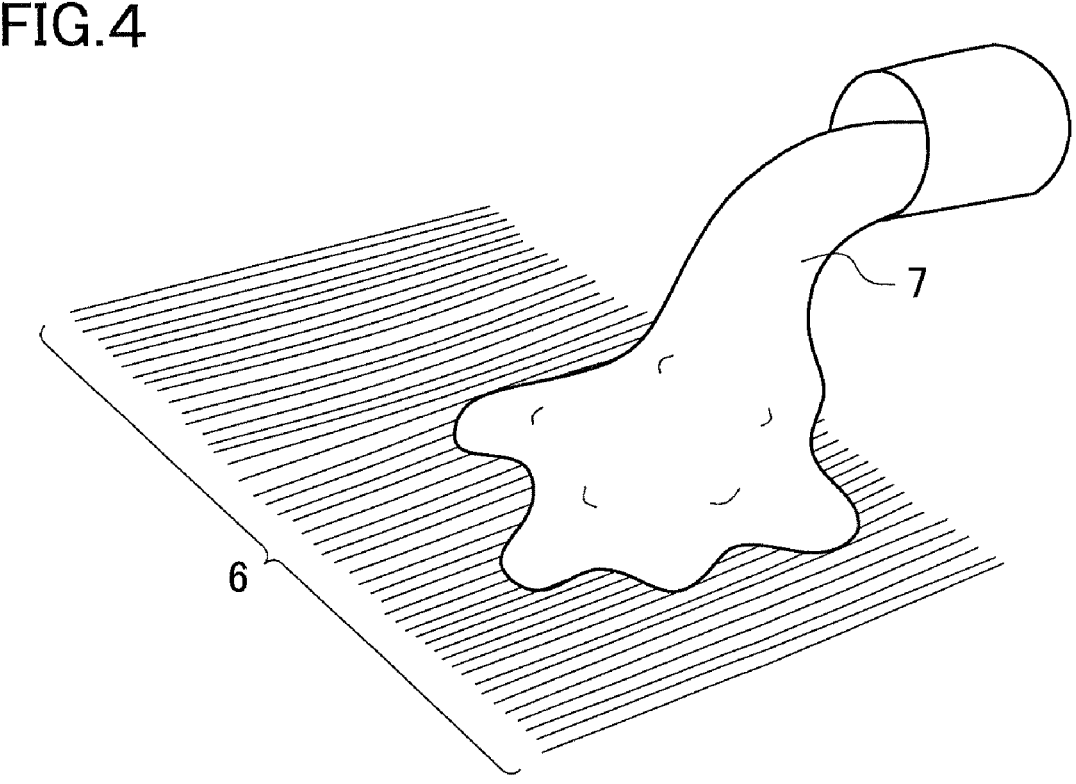
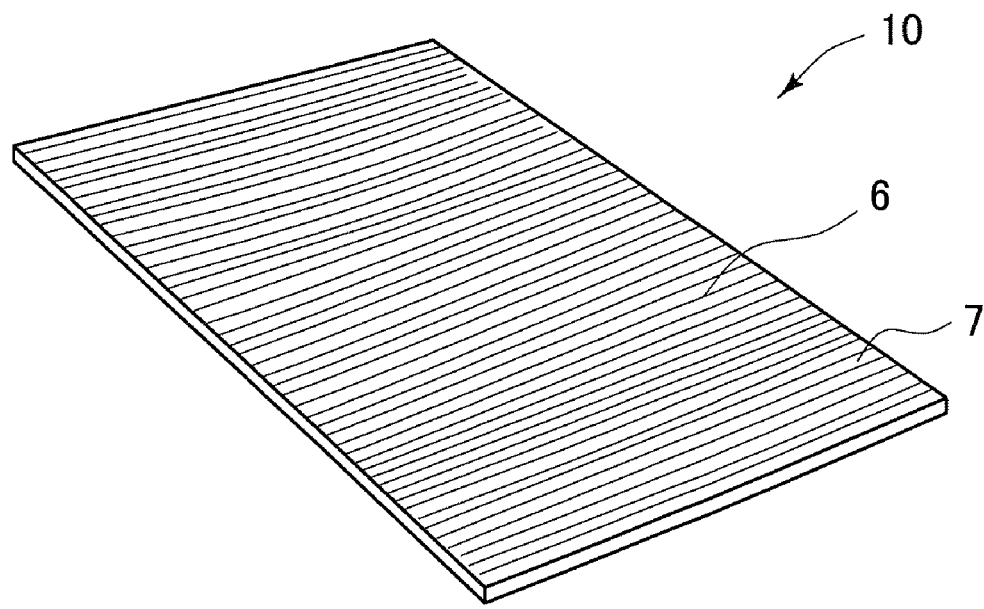

Shaft axis direction

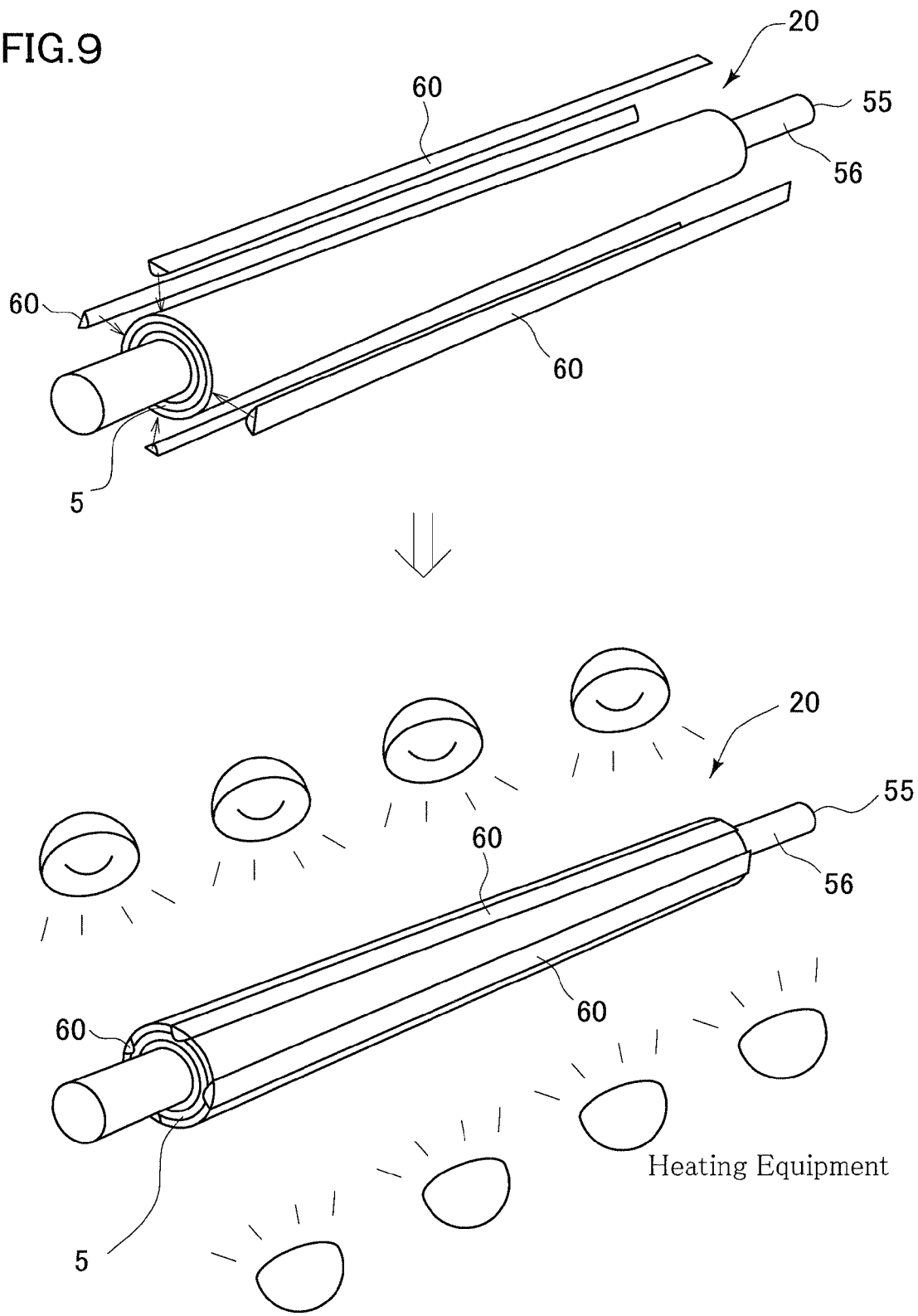

FIG.10A
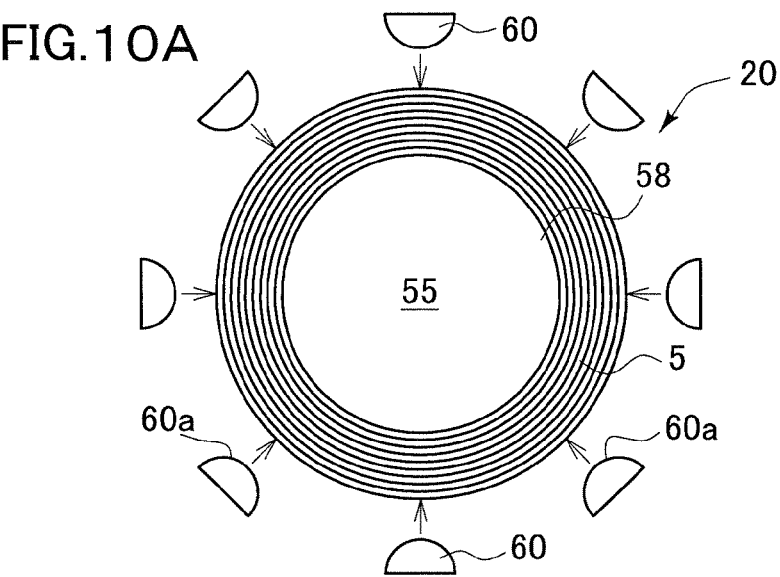
FIG.10B
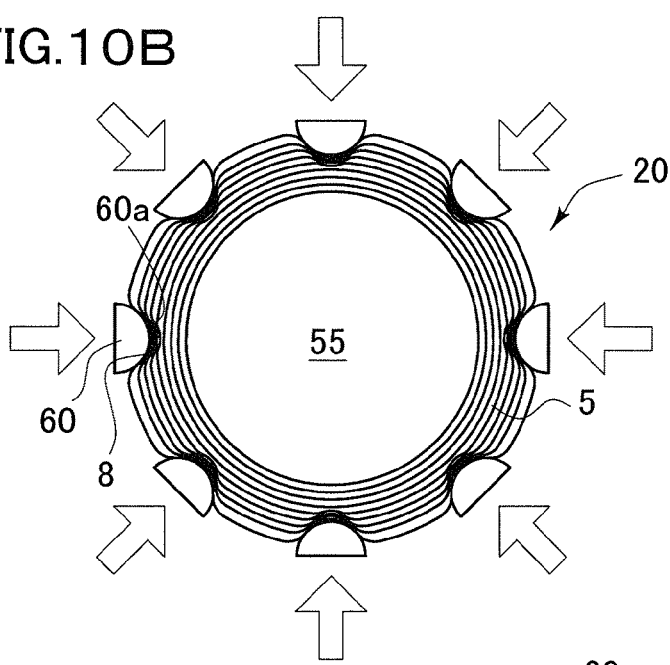
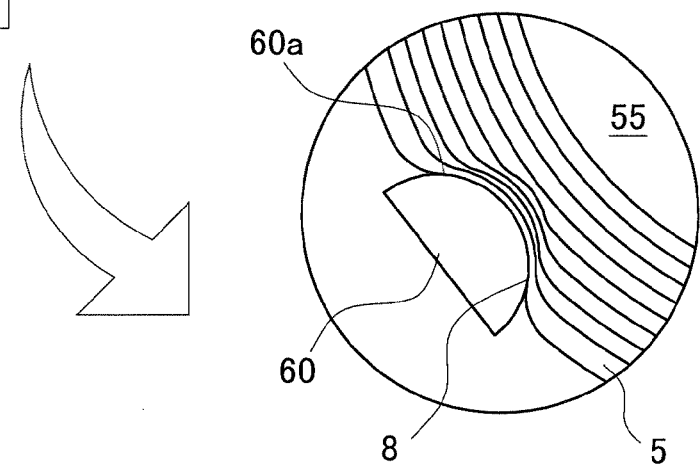
Enlarged View of Main Part

FIG.11
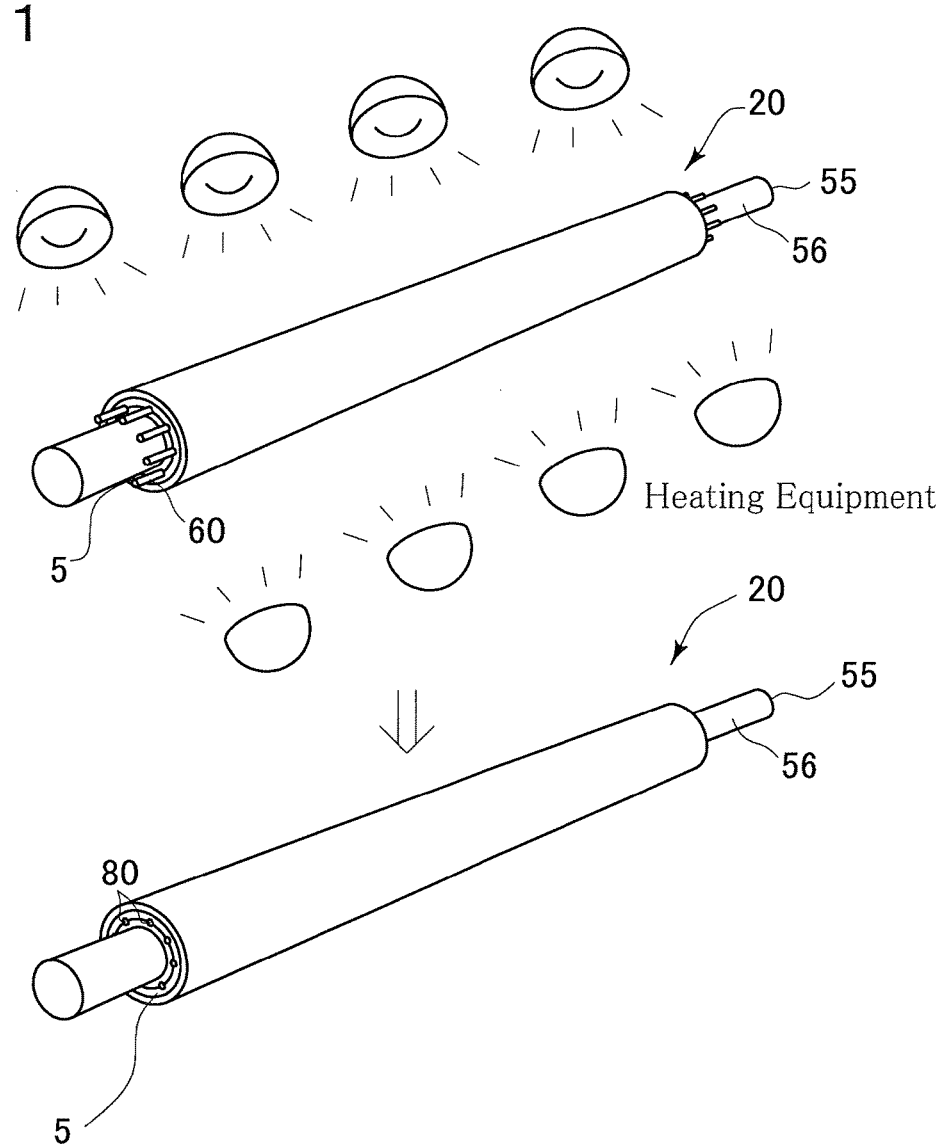
Heating Equipment
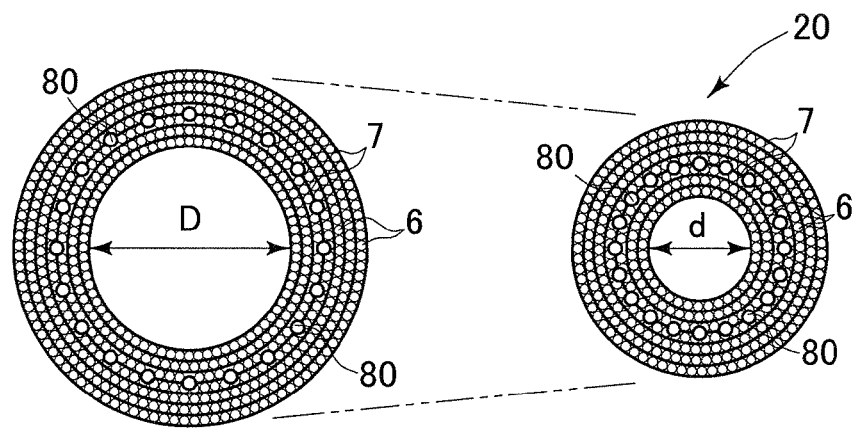
Cross Section View

Enlarged View of Main Part

SPORTS EQUIPMENT

RELATED APPLICATIONS

This application is a National Stage entry of International Application No. PCT/JP2007/050217, filed Jan. 11, 2007, and claims the priority of Japanese Patent Application No. 2006-003922 filed on Jan. 11, 2006. The disclosures of the prior applications are hereby incorporated herein in their entirety by reference.

BACKGROUND OF THE INVENTION

1. Field of the Invention

This invention relates to a sports equipment, specifically a sports equipment having a rod shape.

2. Description of the Related Art

Recently combined materials of reinforced plastic and metal or the like, which are reinforced with reinforcing fiber such as carbon fiber having characteristics such as excellent resilience, high strength, thermo stability, electrical conductivity and corrosion resistivity, and also low gravity and frictional resistivity, are widely used for aircraft parts, satellite parts, automobile parts, sports equipments or the like. For example, as sports equipments they are used for fancy sports equipments such as fishing sticks, golf shafts, tennis rackets, skis and boats.

An example of especially familiar use of the above reinforced combined material is a golf club shaft of a sports equipment. For golf, a traveling distance and direction stability of the ball are important, and thus easy swing of the golf club is required and reduction in weight of the golf club is aimed. Therefore, as the material used, a reinforced fiber combined material attracts attentions. A golf shaft made of a reinforced fiber combined material can be reduced in weight extensively compared with a golf shaft made of metal (for example steel), moreover having a greater degree of freedom of design, for example setting twisting rigidity and bending rigidity relatively freely, and allowing to design a degree of bending according to a golf player's level.

[Patent Document 1] Japanese Laid-Open Patent Publication No. 2004-130564

However, a golf club shaft comprising prepreg layered in a conventional method disclosed the patent document 1 is improved in reduction in weight as well as impact strength and bending strength, but there is a certain limit. Therefore, a golf club shaft made of a reinforced fiber combined material is preferably used for females who prefer a light-weighted golf club or golf players who do not have much strength, however a golf club shaft reduced in weight by decreasing a number of layers of prepreg does not have strength, so that bending occurs more than necessarily, and the swinging track does not remain stable. As a result, tracks of the head and the face become unstable (for example, so called a Toe Down phenomenon, that the head end goes down because of the weight of the head itself or the like), and thus it is very difficult to hit a ball to a desired direction because a degree of the face is messed up. Whereas, powerful golf players, such as experienced players or professional golfers, seek further strength of the golf club shaft, and their fast swing of the club deflects the golf club shaft too far, and further its poor resilience makes the head move slightly slower than the player's intention. Also, deflection and vibration of the golf club shaft occur by the impact when it hits a ball. Therefore, because of the opinions that the ball direction is not stable and it's difficult to handle, it is a current situation that these golf players still use golf club shafts made of metal.

FIG. 15 is a conceptual drawing showing a inner structure of a golf club shaft 100, and FIGS. 16 A to D are drawings showing a example of manufacturing processes of the golf club shaft 100. As shown in FIG. 15, the golf club shaft 100 made of a reinforced fiber combined material is ideally formed by layering repeatedly bias layers 102, having a fiber direction of reinforced fiber 101 thereof being inclined at a predetermined degree to an axis direction O, and straight layers 103, having a fiber direction of the reinforced fiber 101 thereof along the axis direction O.

By the way, the above mentioned bias layers 102 and the straight layers 103 are, as shown in FIGS. 16 A to D, formed by sequentially layering sheet-formed reinforced fiber combined materials cut into a predetermined shape rolled around a core rod 104, for example being made of metal with a tapered shape having a larger diameter to a axis direction, so as to be layered. Most developers believe that this golf club shaft 100 is formed having the above mentioned fiber direction, actually the fiber directions of the reinforced fiber of the sheet-shaped reinforced fiber combined materials are actually not at all as mentioned above, and no one notices this fact. This produces serious problems that the shaft deflects too much as well as that the resilience to the deflection is weak.

Specifically, in a case of rolling the straight layer, as shown in FIGS. 16 A and B, it starts to be rolled, after disposing the reinforced fiber combined material having the fiber direction following the axis direction of the core rod 104. Next, continuing rolling the reinforced fiber combined material around the core rod 104 results, as shown in FIG. 16 C, because of the core rod 104 having a tapered shape in the axis direction, that the reinforced fiber 101 disposed along the axis direction and lined substantially parallel is not straight along the axis direction on a circumferential surface of the tapered shape, and the fiber direction slopes within one round of the rolling-up, so that, as shown in FIG. 16D, the reinforced fiber 101 overlaps in a spiral manner (bias layer), resulting in that it is rolled up merely irregularly. Accordingly, to the axis direction which requires strength most, there is no straight layer 103 exists, as shown FIG. 15, which is supposed to provide bending (deflection) rigidity of the shaft, so as to not be able to secure rigidity, and there is a certain limit of improving the impact strength and the bending strength.

Also, it is still possible to form the above mentioned golf club shaft having the fiber direction of the reinforced fiber overlapping irregularly by overlapping this reinforced fiber combined material repeatedly in order to increase strength, so as to have the same degree of the strength as a metal shaft. However, overlapping it repeatedly makes the entire golf club shaft thick and hard, and resulting in deterioration of its resilience and further increase in weight of the shaft itself, so that there is a dilemma of losing the most advantage of the reinforced fiber combined material, which is reduction in weight of the golf club shaft.

The problem of this invention is to provide a sports equipment made of a reinforced fiber combined material, specifically used for a golf club shaft, maintaining a characteristic of light-weight as well as securing the same or higher strength as a golf club shaft made of metal, and rapid resilience to deflection, such as golf club shaft provided with high strength such as bending rigidity and twisting rigidity capable of suppressing unnecessary bending and vibration.

SUMMARY OF THE INVENTION

In order to solve the above problem, the sports equipment of this invention is characterized by using prepreg in a partially hardened sheet form as a constituent part, obtained by impregnating a reinforced fiber material disposed substantially parallel with a thermal hardening resin material so as to bind thereof, wherein the prepreg is layered so as to form a tapered tube rod having a diameter increasing from one end toward the other, and the tube rod is provided with at least one of a concave and convex portion and a hollow portion along an axis line direction of the tube rod at a predetermined distance around a circumferential direction, and the reinforced fiber having a fiber direction along the axis direction, in order to improve resilience thereof when the tube rod is deflected.

Also, in order to solve the above problem, one specific embodiment of the sports equipment of this invention is characterized by using prepreg in a partially hardened sheet form as a constituent part, obtained by impregnating a reinforced fiber material disposed substantially parallel with a thermal hardening resin material so as to bind thereof, wherein the prepreg is layered so as to form a tapered tube rod having a diameter increasing from one end toward the other, and the tube rod has a hollow portion formed along an axis line direction within a layered portion thereof, as a strengthening means, in order to improve resilience thereof when the tube rod is deflected.

Regarding this invention, a hollow portion is formed along the axis direction as a strengthening means within layers of the tube rod (in other words, the tube rod is formed to have a sandwich structure of an inner circumferential surface, an outer circumferential surface and a wave-shaped core portion formed therebetween), so that it is reduced it in weight compared to a tube rod having the same diameter and its weight can be controlled. Also, on a section area of the layers, by increasing thickness of the area corresponding to the hollow portion in a radial center direction, the tube rod becomes thicker while having the same weight, so as to be rigid. In other words, when bending load is placed on the tube rod, this load acts as divided forces, which are one force of bending the tube and another force of compressing in a circumferential direction, and thus the force of bending the tube becomes smaller than the initial bending load, so that compared with a sold rod, the tube rod is greater in machine performances per unit weight, such as tension, bending compression, impact or the like. Also, because the inner layers constituting the tube rod has a hollow structure along the axis direction so as to have a double-structure of the hollow (tube), it can suppress vibration and deflection, and obtain a less-deflecting stronger sports equipment (in other words, excellent in resilience when bended).

Also, as a strengthening means for the sport equipment of this invention, it is allowed to be constituted including a core member inserted into the hollow portion along the axis direction. Inserting the core member into the hollow portion can improve strength (such as resilience) further, and also controlling strength of the core member can provide with a sports equipment (tube rod) controllable in a greater range of the strength.

Regarding the sport equipment of this invention, the hollow portion is formed by forming a groove-shaped concave portion extending longitudinally along the axis direction on a circumferential wall surface of a pre-rod predetermined to be the tube rod, and layering the prepreg on the circumferential wall surface so as to cover the concave portion.

As described above, forming a concave portion once on the pre-rod allows to form a hollow portion within the layers of the tube rod easily.

Also, in order to solve the above problem, another specific embodiment of the sports equipment of this invention is characterized, wherein the tube rod is configured by layering the prepreg around a core rod having concave and convex extending along the axis direction on a circumferential surface, and by applying pressure to the tube rod toward a radial center of the core rod, as the strengthening means, an inner circumferential concave and convex portion compression-formed linearly or planarly is provided on an inner side of the tube rod in accordance with the concave and convex extending along the axis direction on the circumferential surface of the core rod.

Regarding this invention, by layering the prepreg cut in a predetermined shape by rolling thereof around the core rod having concave and convex on a circumferential surface so as to form the tube rod, the tube rod is provided on the inside with a inner circumferential concave and convex portion compressed linearly or planarly along the concave and convex on the core rod circumferential surface, so that the concave portion formed inner-circumferentially corresponds to the hollow portion, explained above, so as to suppress deflection and vibration, and to obtain a less-deflecting stronger sports equipment (in other words, excellent in resilience when deflected).

A sports equipment of this invention can be applied to a tube-shaped object such as a golf shaft, a fishing rod, a baseball bat, a skiing stick, a racket for example a tennis racket and a badminton racket, and also a stick for example an alpenstock. Then these sports equipments can be controlled in strength of their completed objects, so that it is allowed to adjust according to a sports equipment used or user's preference such as stamina, physical strength and techniques.

BRIEF DESCRIPTION OF THE DRAWINGS

FIG. 4 is a drawing explaining the process of forming the sports equipment.

FIG. 9 is a drawing showing another example 1 of the process of forming the hollow portions.

FIG. 10A is a drawing explaining the process in FIG. 9 in details.

FIG. 10B is a drawing explaining the process continued from FIG. 10A.

FIG. 11 is a drawing showing another example 2 of the process of forming the hollow portions and its cross-section.

BEST MODE FOR CARRYING OUT THE INVENTION

First Embodiment

Hereinafter, an embodiment of this invention will be explained with reference to the embodiment shown in the figures. This embodiment explains mainly about a golf club shaft as an example, however this invention is not only limited to this, and as long as it does not go beyond effect of the claims, various modifications based of knowledge of a person skilled in art are allowed.

Figure 1:
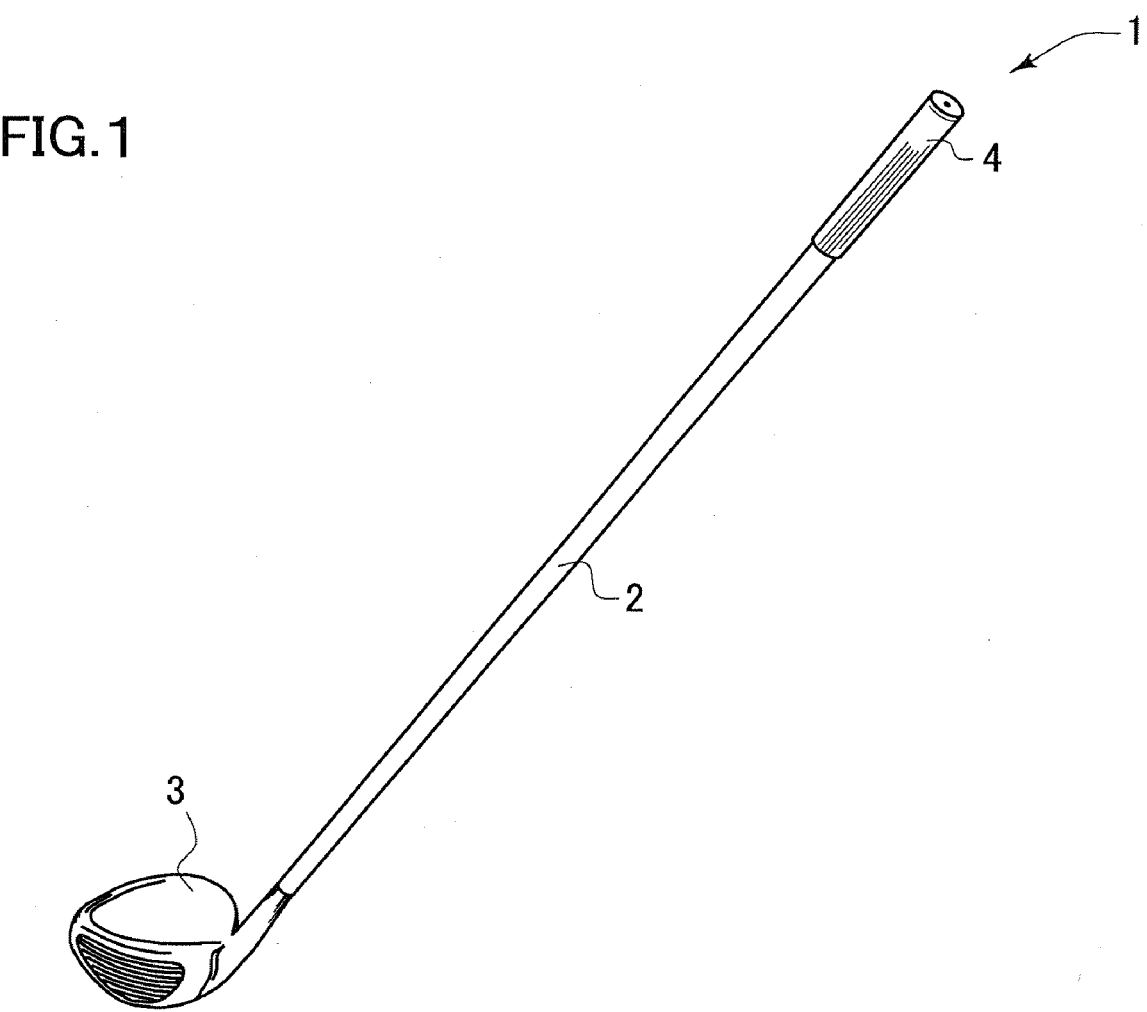
FIG. 1 is a drawing showing an entire golf club including a sports equipment of this invention.

FIG. 1 is a drawing showing an entire golf club including a golf club shaft (hereinafter it is also called merely shaft) that is a sports equipment of this invention. A golf club 1 is provided with a shaft 2 constituting a completed object formed in a tapered shape having a diameter increasing linearly (to an axis direction), a head 3 fixed to one end of the shaft 2 at the smaller diameter end side so as to hit a ball, and a grip 4 fixed to the other end at the larger diameter end side.

Figure 2A:
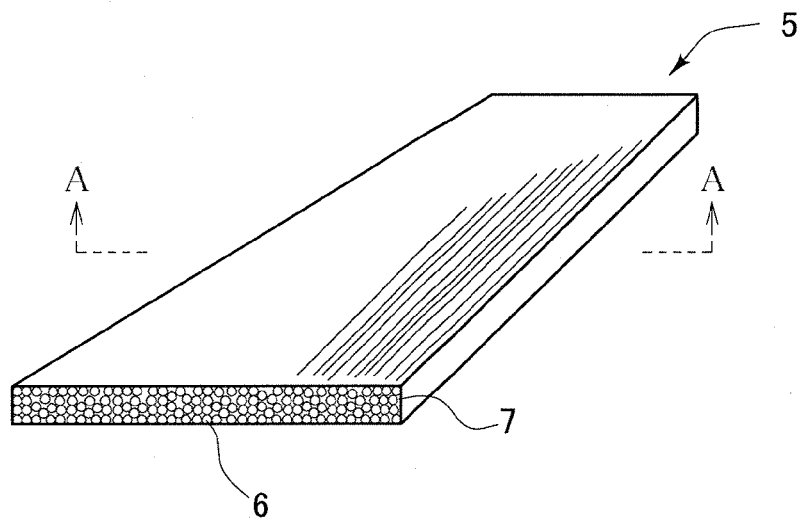
FIG. 2A is a perspective drawing showing an example of a mold prepreg sheet.
Figure 2B:
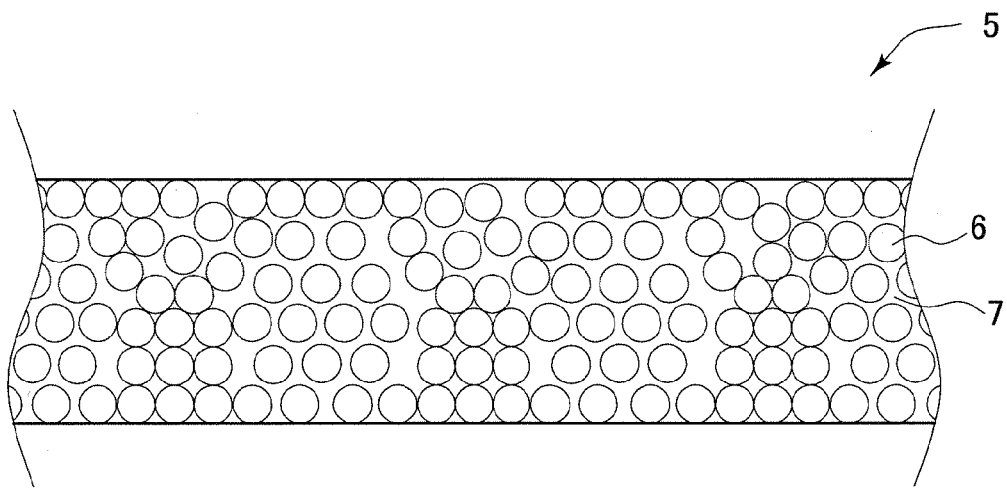
FIG. 2B is an enlarged drawing showing an A-A cross-section of FIG. 2A.

FIG. 2A is a perspective drawing showing an example of a mold prepreg sheet 5 that is a material for forming the completed object used for the shaft (sports equipment) 2 of this invention, and FIG. 2B is an partially enlarged drawing showing an A-A cross-section of FIG. 2A. The completed object (tube rode: shaft 2) is, as shown in FIG. 2A, formed by layering the mold prepreg sheet 5 having an substantial trapezoidal shape or an substantial fan shape, and the mold prepreg sheet 5 is formed by cutting the prepreg, described below, into a predetermined shape.

As shown in FIG. 2B, the mold prepreg sheet 5 is provided with a reinforced fiber material 6 (hereinafter it is also called reinforced fiber) having characteristics such as high strength and high resilience, and a thermal hardening resin material 7 (hereinafter it is also called a thermal hardening resin) having characteristics of being hardened in an insoluble state by heating. Here, the mold prepreg sheet 5 can be obtained, as stated below, by impregnating the thermal hardening resin 7 into the reinforced fiber 6 so as to make the thermal hardening resin 7 in a partially hardened state. As the reinforced fiber 6, for example, carbon fiber, wholly aromatic polyamide fiber, metallic fiber, aramid fiber, glass fiber, boron fiber, or other fibers having high strength and high resilience can be used. Above all, carbon fiber is recommended as its excellent specific strength and specific resilience. These reinforced fibers 7 can be used solely or used plurally with different kinds thereof.

Also, as the thermal hardening resin 7, thermal hardening resins, such as epoxy resin, unsaturated polyester resin and phenol resin can be used. Above all, in view of adhesiveness to the reinforced fiber, strength manifestation, shrinkage by hardening, humidity resistance, weather resistance or the like, epoxy resin is recommended. These hardening resins 7 can be used solely or used plurally with different kinds thereof.

Figure 3:
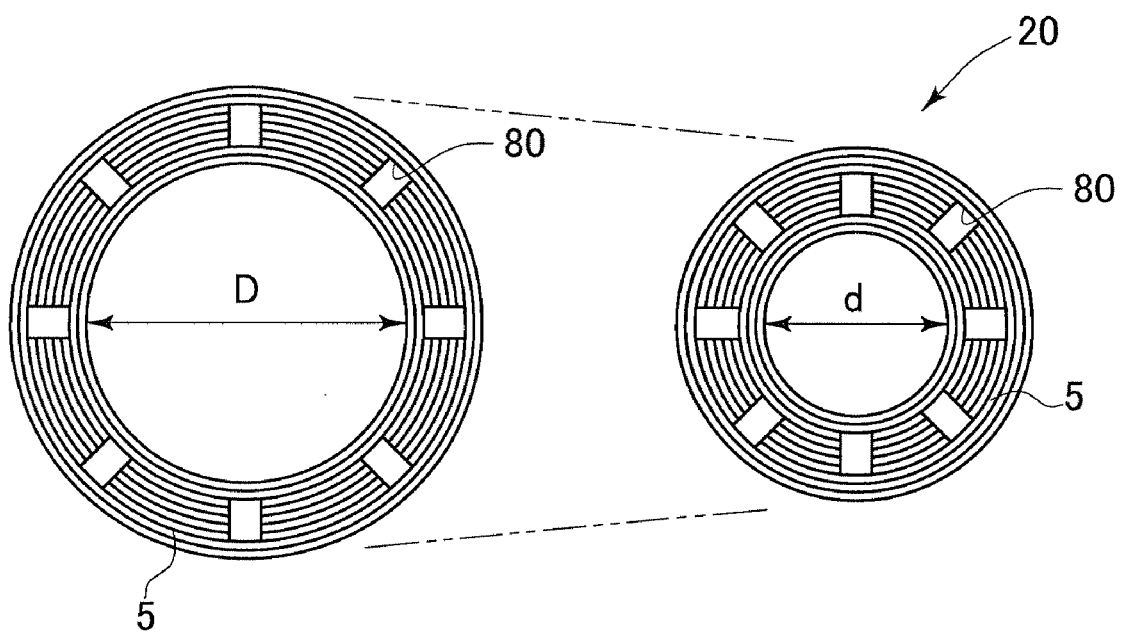
FIG. 3 is a cross-section drawing showing a completed object constituting the sport equipment of this present invention.

FIG. 3 is a conceptual cross-section drawing showing an example of a completed object (layer object 20) constituting the shaft 2. The layer object 20 is formed by layering the above mentioned mold prepreg sheets repeatedly, being a tapered shape having a diameter increasing from one end toward the other, and being in a tube shape in a cross-section. Also, a hollow portion 80 (strengthening means) is formed within the layer object. A plurality of the hollow portions 80 are formed along the axis direction in a circumferential direction. The layer object 20 may have the hollow portions 80 left as they are, and in this case, the weight can remain light. Also, when deflection or twisting occurs in the layer object 20, the hollow portion 80 is deformed resiliently around inner wall surface thereof, and thus its resilience can produce huge repulsion force in the shaft 2. On the other hand, into these hollow portions 80 a thermal hardening resin material 7 or the like can be filled as a filler (strengthening means), and also a core member (strengthening means), which will be explained below, can be inserted thereto. In addition, a plurality of the hollow portions 80 can be provided radially within the layers of the layer object 20, and in this case, it increases bending strength and deflection resilience as well as achieves large reduction in weight.

Also, impact strength and deflection (twisting rigidity and bending rigidity) when completed as a golf shaft can be controlled by accordingly selecting a material and a diameter of the reinforced fiber 6, its fiber direction, and the thermal hardening resin 7, and a further range of impact strength, deflection (twisting rigidity and bending rigidity) and resilience thereof can be controlled by accordingly selecting a shape, a size and a position of the hollow portion 80. Furthermore, when the completed object (layer object 20) is obtained by layering the formed mold prepreg sheets 5, it includes a less number of the mold prepreg sheets 5 compared with a competed object having no hollow portion in order to achieve the same strength, resulting in reduction in weight.

Next, a manufacturing process of the completed object (shaft 2) will be explained using FIGS. 4 to 7B. As shown in FIG. 4, first, the thermal hardening resin (for example, epoxy resin) 7 in a liquid state is impregnated into the reinforced fiber (for example, carbon fiber) 6 disposing parallelly aligned, for example, on a detachable supporter (not shown in the figure). This impregnated thermal hardening resin 7 is partially hardened and detached from the supporter, so as to form a sheet-shaped prepreg 10. Also, other than disposed parallelly aligned, the reinforced fiber 6 may be disposed parallelly aligned crossways, and further may be used by impregnating the thermal hardening resin 7 thereto in a textured state.

Figure 5:
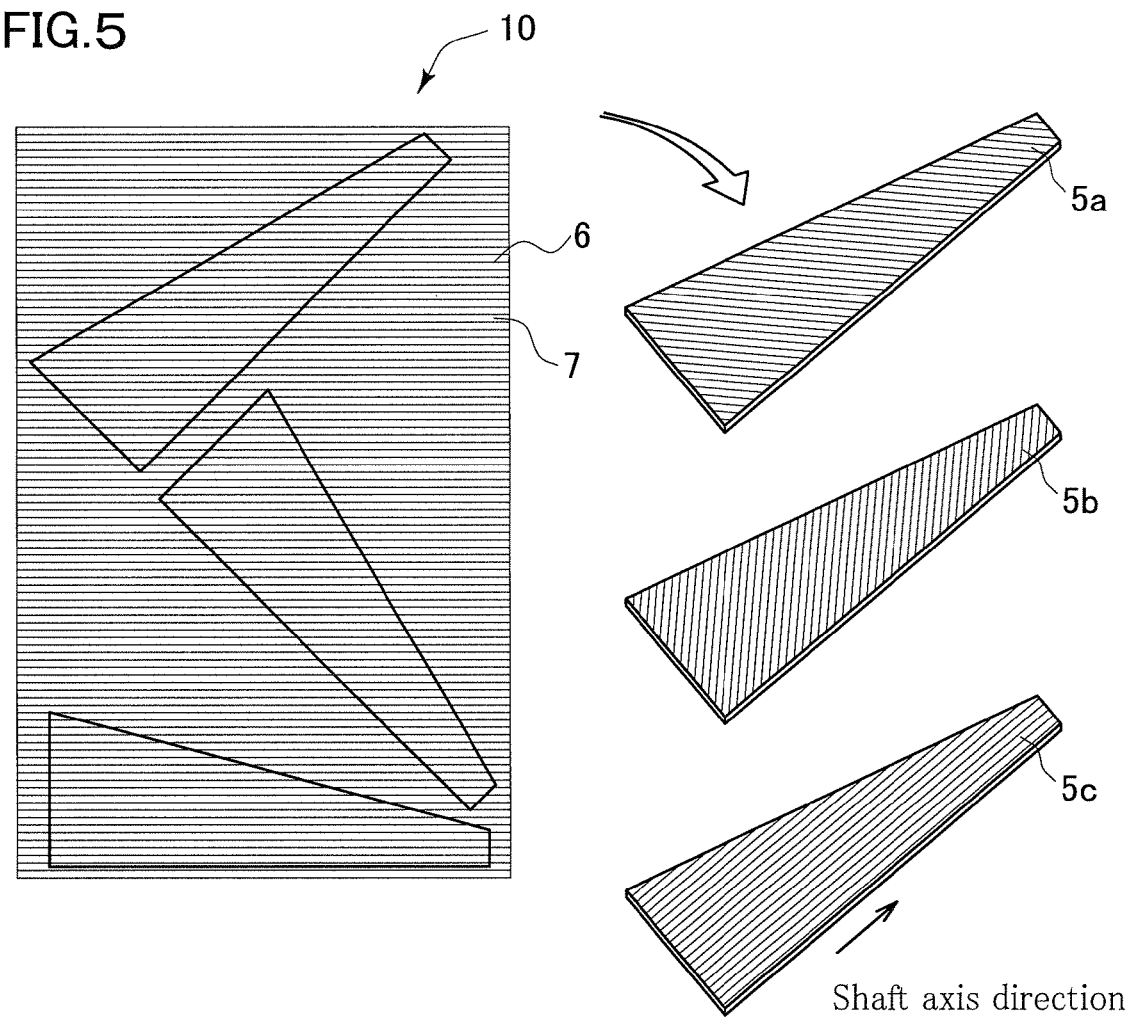
FIG. 5 is a drawing explaining the process continued from FIG. 4.

Next, as shown in FIG. 5, the prepreg 10 is cut in a predetermined shape and fiber direction by a cutting machine (not shown in the figure) so as to obtain a mold prepreg sheet 5. During this process, as a cutting shape, for example, because the shaft 2 is formed to have a tapered shape increasing its diameter linearly, in other words, because a core rod, which will be explained below, used for forming the shaft 2 has a tapered shape increasing its diameter linearly, the prepreg 10 is cut in order to have a substantial fan shape or a substantial trapezoidal shape formed when the core rod is opened.

Also, regarding the fiber direction of the reinforced fiber 6 to be cut, because a reinforced fiber combined material is very strong against a force in a direction parallel to the fiber, for example, the golf club shaft is loaded by bending and twisting when swung, in order to effectively exert characteristics of the reinforced fiber 6 such as high strength and high resilience to the load, it is recommended to cut a mold prepreg sheet 5a or 5b, in which the fiber direction at beginning of being rolled around the core rod is inclined at plus or minus 45 degrees to the axis direction when forming the shaft, or a mold prepreg sheet 5c, in which the fiber direction at beginning of being rolled around the core rod is inclined zero degree (5a, 5b and 5c can be represent as 5 hereinafter).

Regarding to these cutting shapes and directions, it is not only limited to this, and for example, for a fishing rod it is recommended to cut the prepreg 10 to have the fiber direction at beginning of being rolled around the core rod is inclined 0 or 90 degrees to a axis direction of the fishing rod, and a mold prepreg sheet 5 can be obtained by various settings according to a sports equipment used.

Figure 6A:
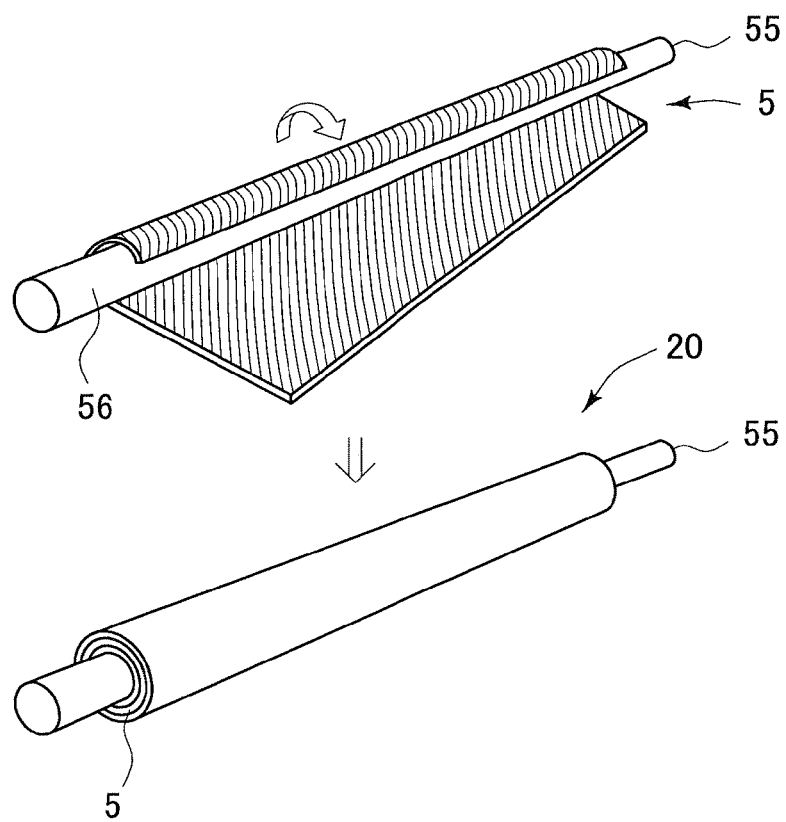
FIG. 6A is a drawing explaining the process continued from FIG. 5.
Figure 6B:
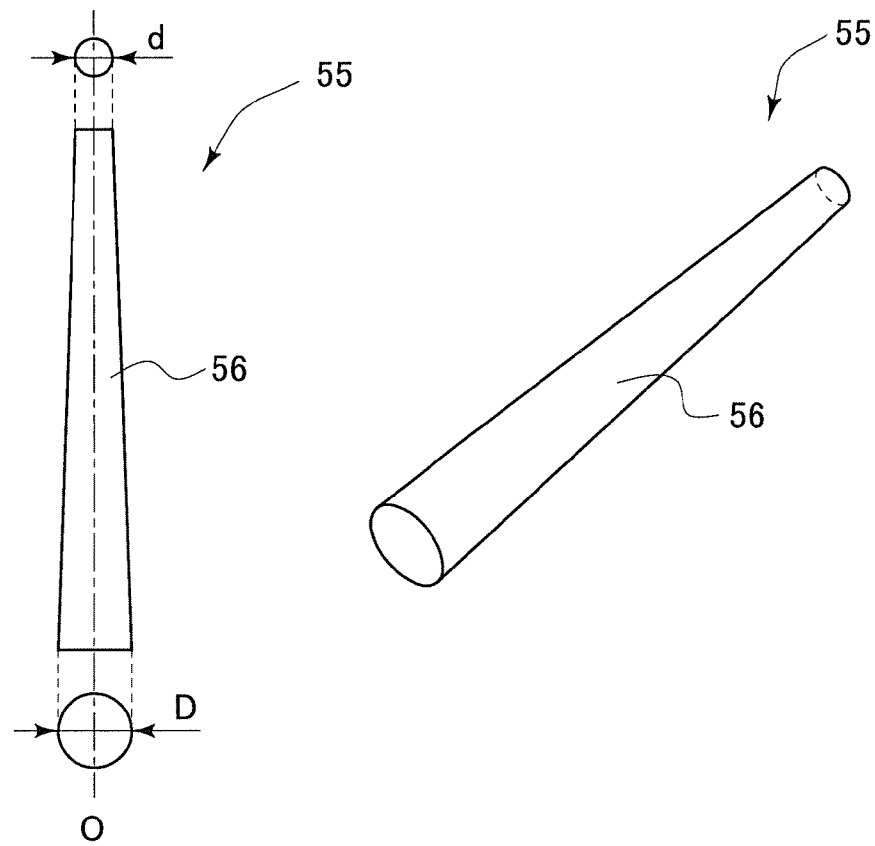
FIG. 6B is a drawing showing an example of the core rod.

Continuously, as shown in FIG. 6A, the mold prepreg sheet 5 is rolled up to, for example, a core rod 55 having a substantial circle shape in a cross section to the axis direction, made of steel, and having a circumferential surface 56 provided with a tapered shape having a diameter increasing (D>d) linearly (to the axis direction) (referred to FIG. 6B). During this process, the mold prepreg sheets 5 are, as explained above (shown in FIG. 5), the mold prepreg sheets 5a 5b and 5c which are cut in a different fiber direction of the reinforced fiber 6, and thus these mold prepreg sheets 5a, 5b and 5c are respectively rolled around the core rod 55 one on top of the other, so as to form the layer object 20. More specifically, the layer object 20 is formed having a layer structure of layering repeatedly a bias layer, in which the fiber direction at beginning of being rolled around the core rod of the mold prepreg sheet 5a, 5b or the like is inclined to an axis direction of the layer object 20, and a straight layer, in which the fiber direction at beginning of being rolled around the core rod of the mold prepreg sheet 5c or the like is along to the axis direction of the layer object 20. In addition, because the mold prepreg sheet 5 is layered by rolling around the core rod 55, a position corresponding to the core rod 55 becomes hollow, so as to be formed as a tube rod.

Figure 7A:
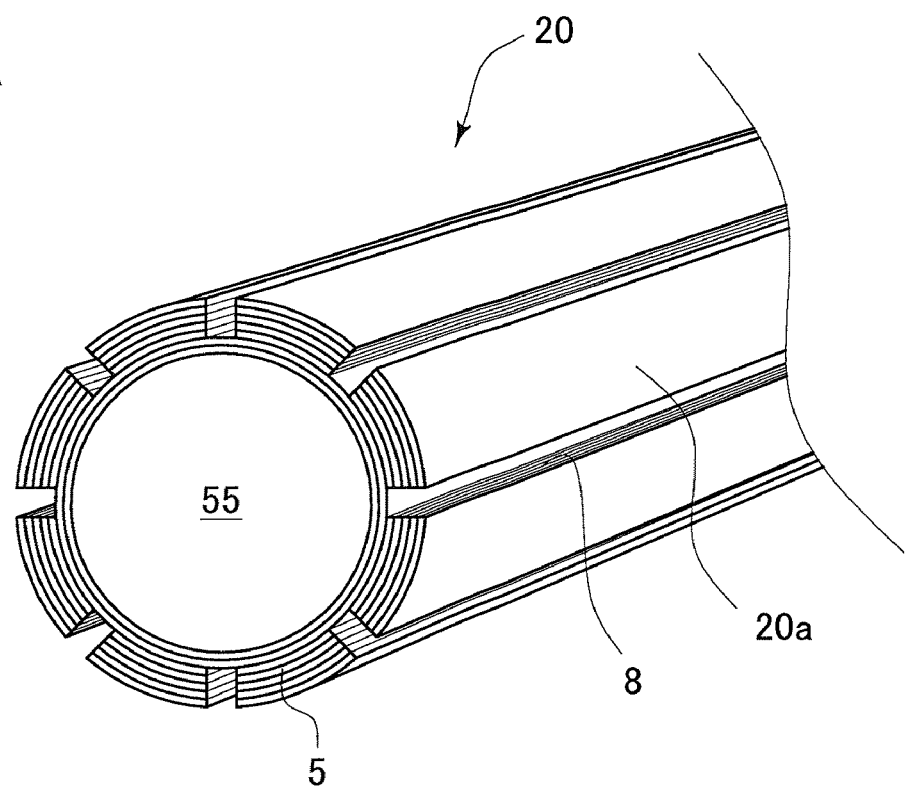
FIG. 7A is a drawing explaining the process continued from FIG. 6A.
Figure 7B:
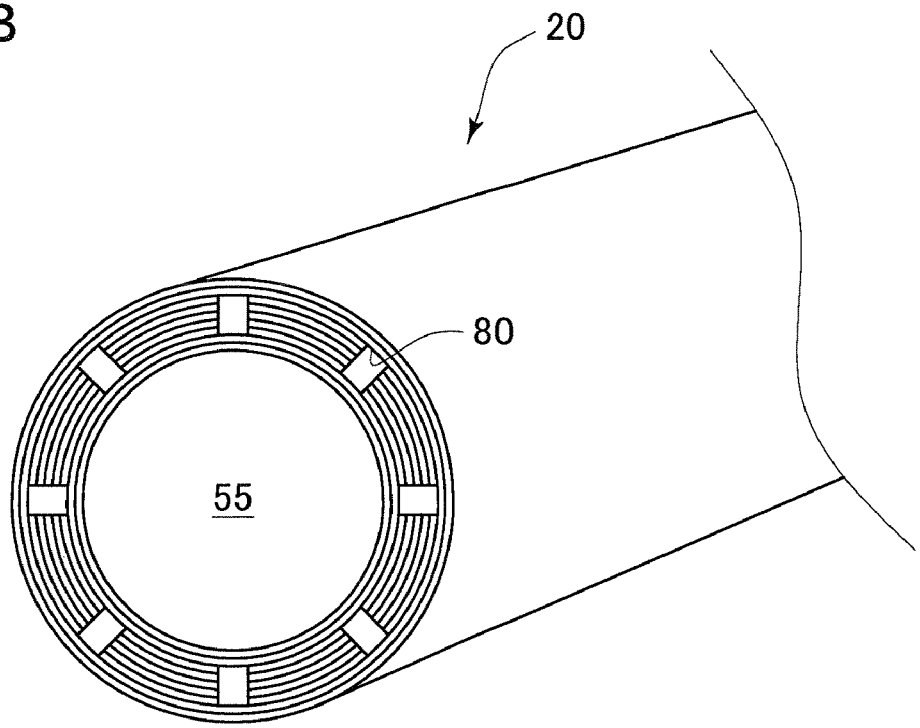
FIG. 7B is a drawing explaining the process continued from FIG. 7A.

Next, as shown in FIG. 7A, having the obtained layer object 20 as a pre-rod, and using a cutting tool or laser not shown in the figure, a cutting process is conducted to form a concave portion 8 having a groove shape extending longitudinally along the axis direction on a circumferential wall surface 20a. Continuously, by layering the mold prepreg sheet 5 further by rolling thereof to the circumferential wall surface 20a so as to cover the concave portions 8, the layer object 20 having hollow portions is formed (referred to FIG. 7B). In addition, after completing processes of solidifying the completed object by applying an appropriate publically-known heating treatment, and pulling out the core rod 55, the completed object provided with the hollow portions 80 inside is completed (not shown in the figure). Therefore, by forming the hollow portions 80 along the axis direction, the completed object having excellent rigidity as well as resilience when deflected can be obtained.

Also, the hollow portions may be formed entirely over the axis direction of the layer object, or may be formed partially. Specifically, for example, regarding the golf club, the shaft tends to be deflected more at a fore end side near the head than a rear end side near the grip when swung, and thus by forming the hollow portions at a position distanced for a predetermined space from the fore end, a less-deflectable and stable golf shaft can be achieved. In addition, because the shaft has a tapered shape, in order to avoid the adjacent hollow portions overlapping at the fore end side of the shaft, they can be thin out at the middle.

Figure 8A:
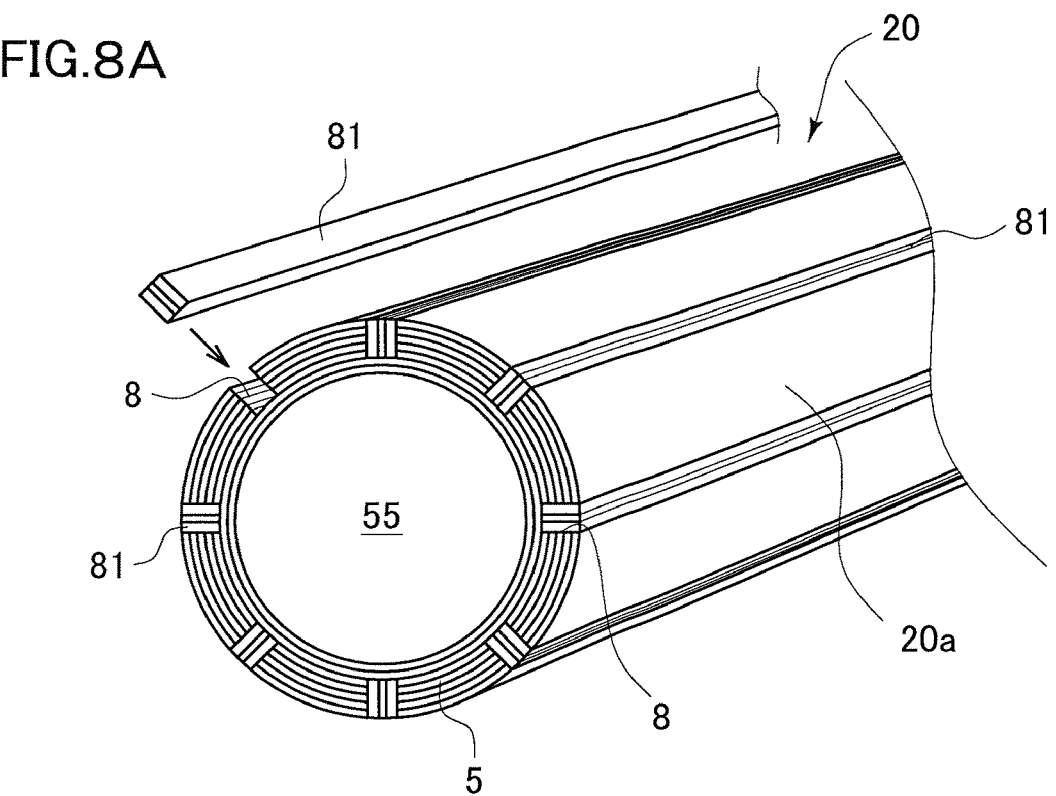
FIG. 8A is a drawing showing an example of the process of placing the core member.
Figure 8B:
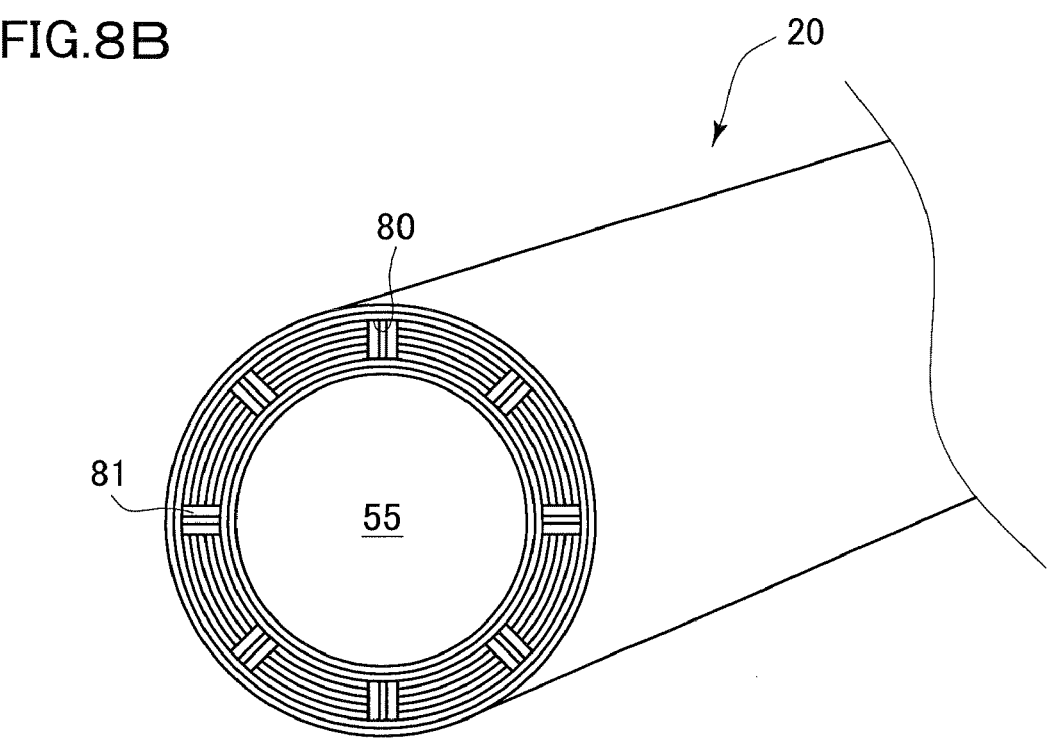
FIG. 8B is a drawing explaining the process continued from FIG. 8A.

FIGS. 8A and 8B are drawings showing an example of the process of placing the core member as a strengthening means, regarding the layer object 20 though the hollow portions 80 may be left as they are formed, shown in FIG. 8A, core members 81 may be inserted. The core members 81 are not specifically limited, and they are placed along the concave portions 8 (hollow portions 80). For example, an elastic member such as rubber or layered and solidified prepreg obtained by impregnating the thermal hardening resin 7 into the reinforced fiber 6 similarly to the mold prepreg sheet 5 (preferably, placing the reinforced fiber 6 along longitudinal direction) may be used. Then, in a case of having a board shape, because the core member 81 being in a board shape can be bent easily in a thickness direction, but not in a width direction, disposing it so as to have its width direction along a radial direction of the layer object 20 (referred to FIG. 8B) allows to increase bending strength (deflection and resilience) of the layer object 20 effectively. In addition, the core member 81 may be formed at the same time by disposing silkworm gut or the reinforced fiber 6 and filling the thermal hardening resin 7 in the concave portions 8 formed by cutting.

As an installing method of the core members 81, they may be pushed along the axis direction after completing the layer object 20, but they can be easily inserted into the hollow portions 80 by disposing the core member 81 after forming the concave portions 8 on the circumferential wall surface 20a, and then layering the mold prepreg sheet 5 by rolling up.

Next, FIG. 9 is a drawing showing another example 1 of the process of forming the hollow portions, and FIGS. 10A and 10B are drawings explaining the process of FIG. 9 in details. As shown in FIG. 9, for example, when the layer object 20 is obtained by layering the above stated mold prepreg sheet 5 on the circumferential surface 56 of the core rod 55 (or a core rod 57 which will be explained below) and solidifying thereof by a heat treatment, it is heated while being held in a state that pressing members 60 are pressed to the circumferential wall surface of the layer object 20. Here, the pressing members 60 are made of metal and formed linearly longitudinal. Also, the cross-section shape to the longitudinal direction is not specifically limited, and it could be appropriately adjusted according to a diameter and the installing number or the like of the layer object 20, having as a circle shape, an oval shape, a triangle shape, a rectangular shape, a concave and convex shape, or the like. The pressing members 60 are disposed at an equal distance in a circumferential direction so as to have its longitudinal direction along the axis direction of the layer object 20 (referred FIG. 10A). By applying a pressure process to the circumferential surface equally to the radial center direction, contact portions 60a of the pressing members 60, which contact the layer object 20, relatively press the layer object 20 from the outside, so as to form concave portions 8 on the outside of the layer object 20 (referred to FIG. 10B). Then, by layering the mold prepreg sheet 5 to cover these concave portions 8, hollow portions 80 are formed. In addition, the hollow portions 80 are formed on the entire length of the layer portion 20, however may be provided partially.

Next, FIG. 11 is a drawing showing another example 2 of the process of forming the hollow portions and its cross-section. As shown in FIG. 11, the layer object 20, which is obtained by further layering the mold prepreg sheet 5 in a state that the pressing members 60 are pressed on the circumferential wall surface, is solidified by a heat treatment. Here, the pressing members 60 are disposed at an equal distance in a circumferential direction so as to have its longitudinal direction along the axis direction of the layer object 20. Herewith, after a process of compressing an inner layer portion of the layer object 20 relatively on entire circumferential surfaces of the pressing members 60, and a process of pulling out the pressing members 60, hollow portions 80 are formed at corresponding positions. In addition, the pressing members may be replaced with the above core members, and in this case, they can be left as a strengthening means.

Figure 12:
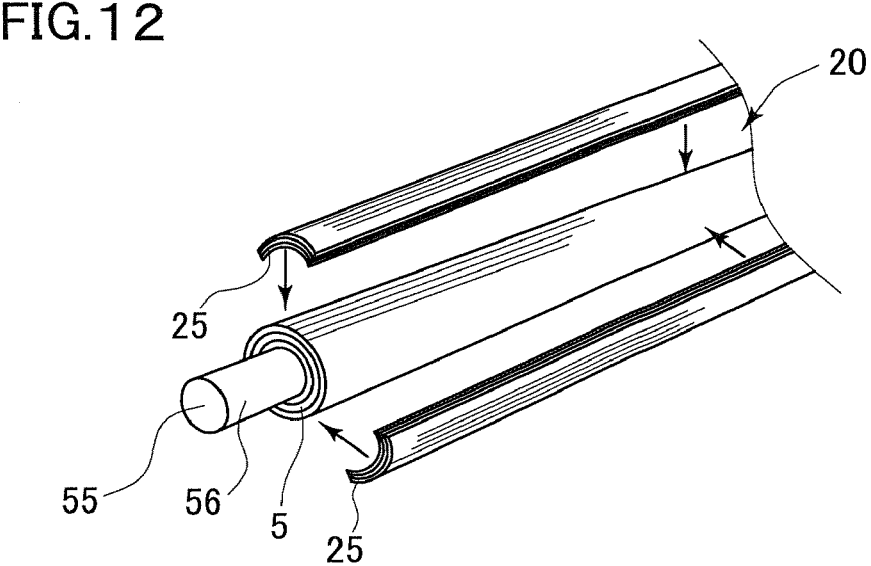
FIG. 12 is a drawing showing another example 3 of the process of forming the hollow portion.

Next, FIG. 12 is a drawing showing another example 3 of the process of forming the hollow portions. As shown in FIG. 12, the layer object 20 is layered by rolling the mold prepreg sheet 5 on the circumferential surface 56 of the core rod 55 up to a position where hollow portions are formed, then the layer object 20 is layered with mold prepreg sheets 25 in a sheet form, for examples, a substantial reed shape or a substantial rectangular shape, in a circumferential direction at an equal distance and away from each other for a predetermined distance, so as to form spaces between the adjacent mold prepreg sheets, and then the above mold prepreg sheet are layered by rolling on the top thereof to cover the spaces, so as to form the hollow portions 80 (referred to FIGS. 7A and 7B). This allows to reduce weight of the layer object 20, to secure bending strength fully to the axis direction, and to produce rigid resilience (repulsion force) when the layer object 20 (shaft) is deflected.

Figure 15:
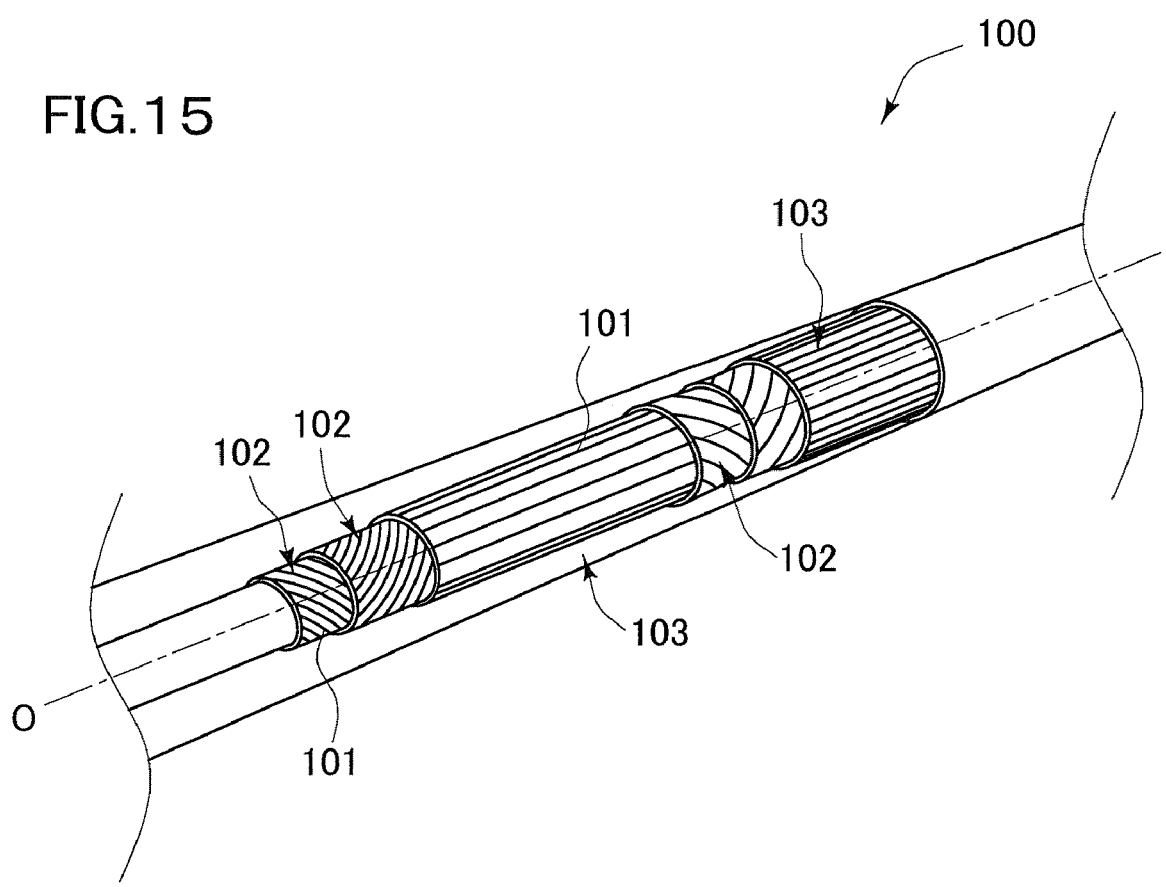
FIG. 15 is a concept drawing showing an inner structure of the golf shaft.
Figure 16A:
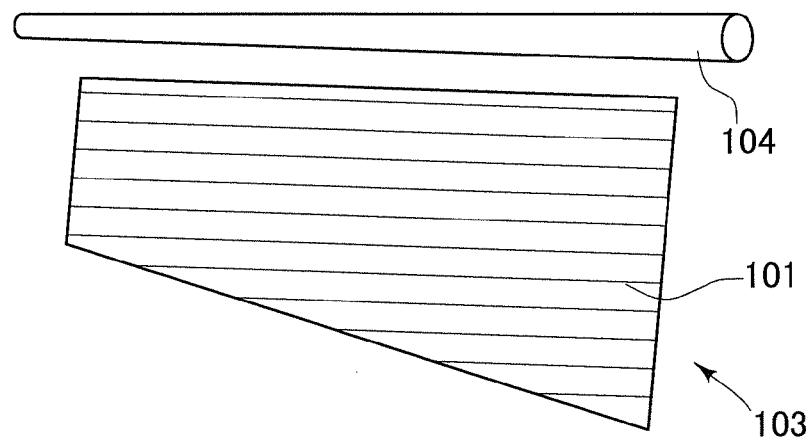
FIG. 16A is a drawing showing an example of the manufacturing process of the golf shaft.
Figure 16B:
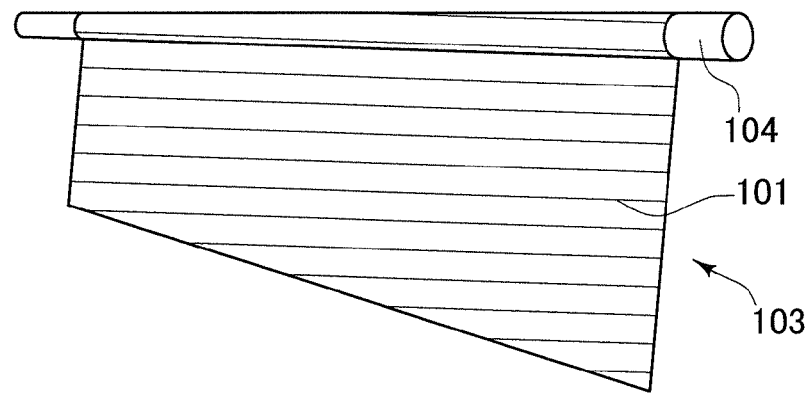
FIG. 16B is a drawing explaining the process continued from FIG. 16A.
Figure 16C:
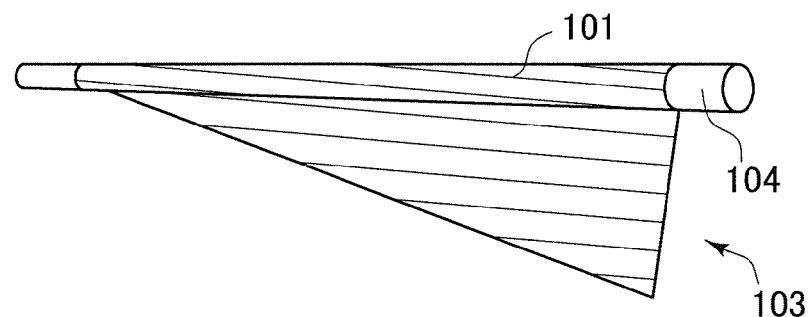
FIG. 16C is a drawing explaining the process continued from FIG. 16B.
Figure 16D:
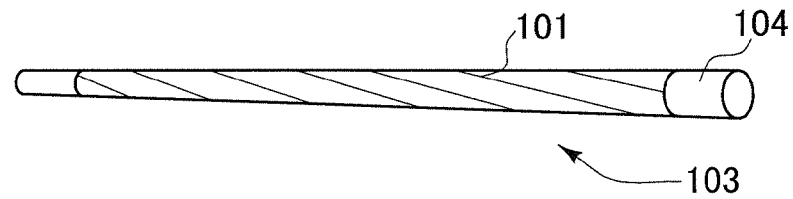
FIG. 16D is a drawing explaining the process continued from FIG. 16C.

In addition, the mold prepreg sheets 25 in a reed shape are preferably formed by cutting the prepreg 10 being longitudinal to the fiber direction of the reinforced fiber material 6. In this case, by pressure-bonding the mold prepreg sheet 25 to the circumferential surface 56 of the core rod 55 having a tapered shape in a reed shape so as to be disposed having its longitudinal direction along the axis direction, and then pressure-bonding thereof sequentially in the circumferential direction on the entire circumference (in other words, forming reinforced fiber having a fiber direction along the axis direction in the circumferential direction on the entire circumference), a straight layer can be formed having the reinforced fiber 6 along the axis direction in the circumferential direction on the entire circumference (in other words, provided with a strengthening means along the axis direction). This allows to realize forming an ideal golf club shaft, shown in FIG. 15, having straight and bias layers repeatedly layered, provided with the reinforced fiber having its fiber direction along the axis direction, so as to achieve a rigid golf club shaft.

Embodiment 2

Figure 13:
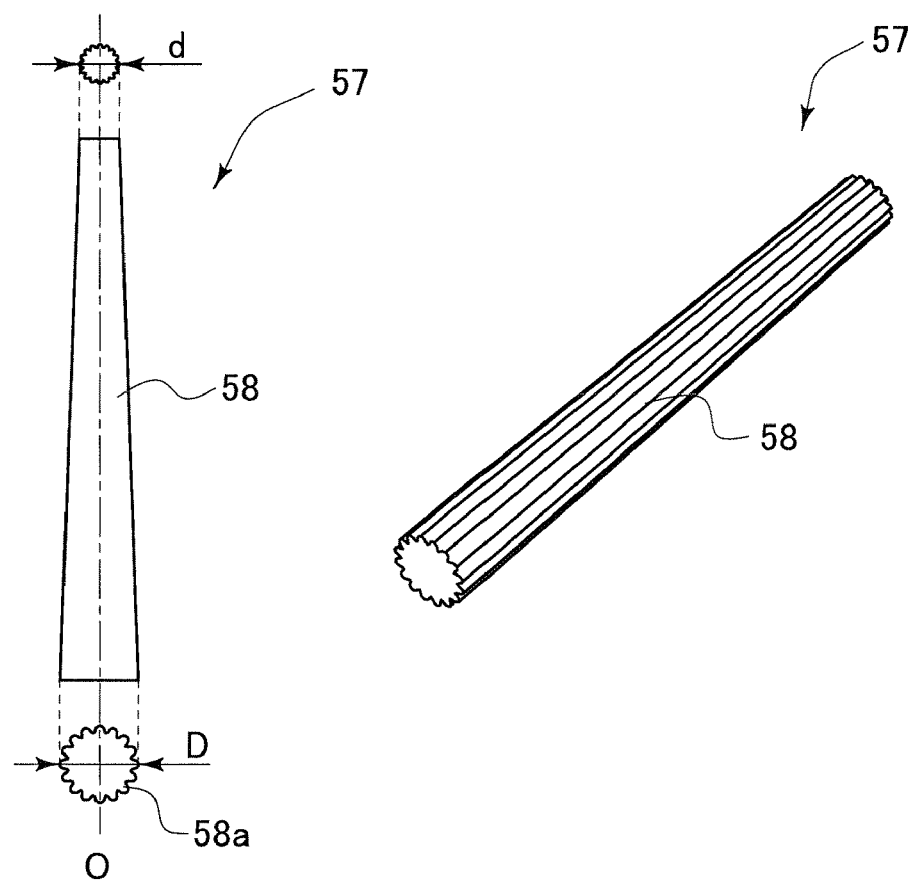
FIG. 13 is a drawing showing an example of another core rod.
Figure 14A:
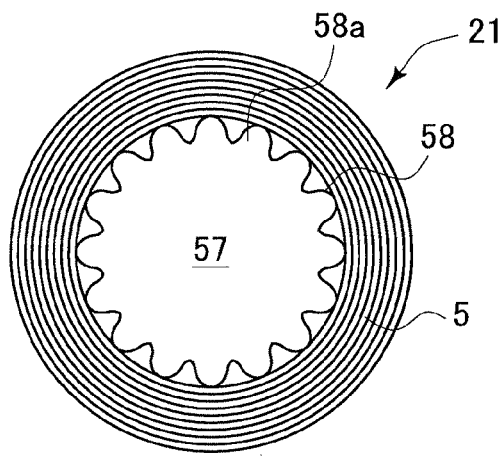
FIG. 14A is a drawing showing an example of the manufacturing process using the core rod in FIG. 13.
Figure 14B:
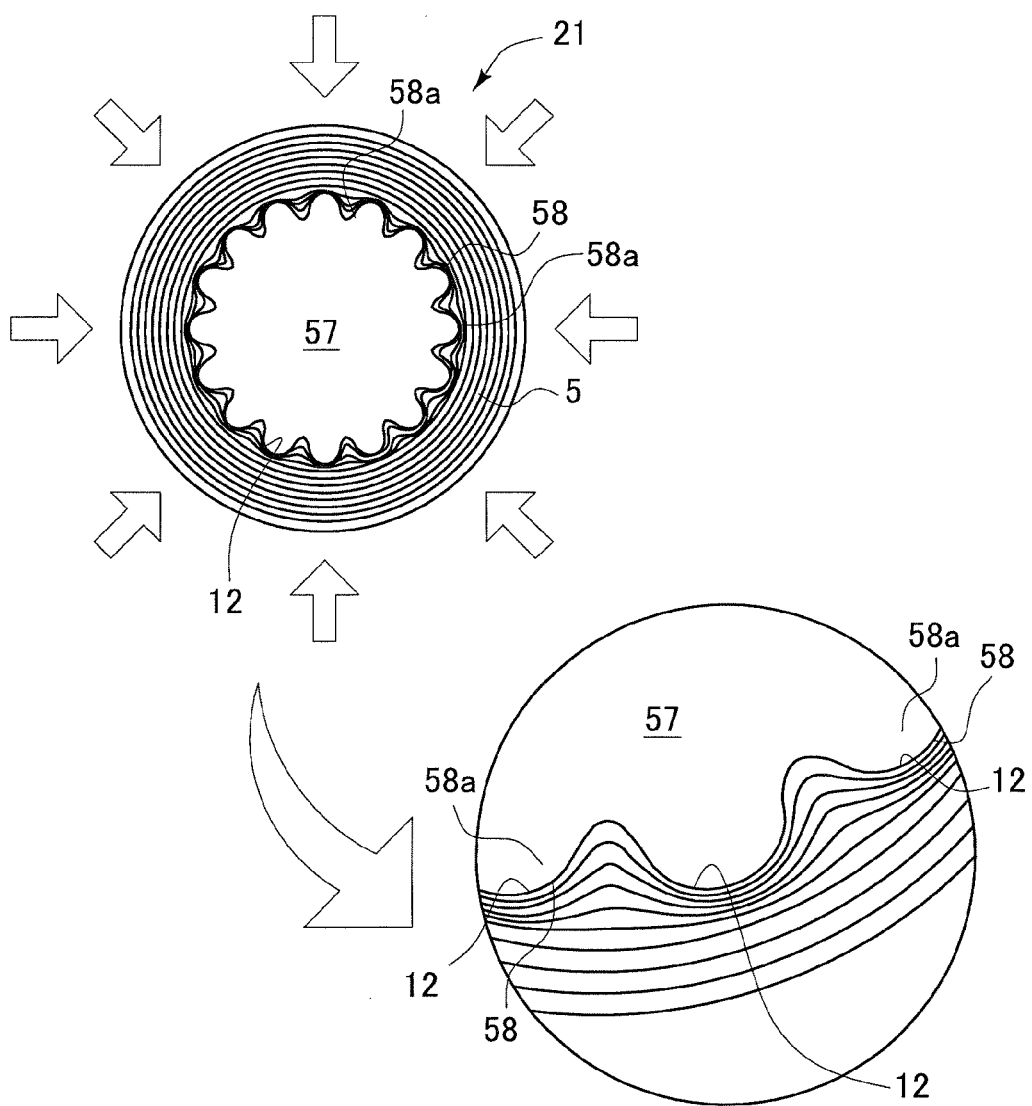
FIG. 14B is a drawing explaining the process continued from FIG. 14A.

Next, FIG. 13 is a drawing showing another example of the core rod, and FIGS. 14A and 14B are drawings showing an example of the manufacturing process using the core rod of FIG. 13. As shown in FIG. 13, a core rod 57 for example, is made of steel, provided with a circumferential surface 58 having a tapered shape having a diameter increasing (D>d) linearly to the axis direction, on the circumferential surface 58 convex portions 58a protruding radially are formed at an equal distance to the circumferential direction, and the convex portions 58a are formed continuously to the axis direction. An edge line shape of the convex portions 58a can be formed acute angled, obtuse angled or curved in a cross section, and it may be adjusted accordingly.

As shown in FIG. 14A, for example, the above stated mold prepreg sheet 5 is layered by rolling on the circumferential surface 58 of the core rod 57 repeatedly, so as to form a layer object 21. At this time, the prepreg sheet 5 placed inside of the layer object 21 is layered by rolling while striding over the adjacent convex portions 58a, on the circumferential surface 58. Next, as shown in FIG. 14B, by applying a pressing process to the layer object 21, which is formed by layering the mold prepreg sheet 5 by rolling repeatedly to the core rod 57, to a radial center direction uniformly to the circumferential surface, the convex portions 58a formed on the circumferential surface 58 of the core rod 57 compress inside of the layer object 21 relatively, so as to form concave portions 12 as an inner circumferential concave and convex portion inside of the layer object 21.

In a case that these concave portions 12 (inner circumferential concave and convex portions) are formed inside of the layer object 21, for example, linearly (streaky) along the axis direction, a stronger completed object can be manufactured. Also, while doing so, the layer object 21 can be formed by forming hollow portions in the mold prepreg sheet 5. As described above, by forming the inner circumferential concave and convex portions inside of the layer object, and further forming the hollow portions inside of the layer, the completed object having better rigidity and also rapid resilience when deflected can be obtained.

As described above, the strengthening means (the hollow portions, the inner circumferential concave and convex portions, the reinforced fiber material of the fiber direction are provided along the axis direction in a circumferential direction on a entire circumference of the tube rod shaped completed object obtained, so that it is extremely strong against force especially in a linearly (streaky) parallel direction.

Also, by providing only desired areas as the completed object with the strengthening means, it is possible to adjust the strength easily.

What is claimed is:

1. A golf shaft using prepreg in a partially hardened sheet form as a constituent part, obtained by impregnating a reinforced fiber material disposed substantially parallel with a thermal hardening resin material so as to bind thereof, wherein the prepreg is layered so as to form a tapered tube rod comprising a plurality of layers and having a diameter increasing from one end toward the other the tube rod is provided with a plurality of concave portions having a groove shape extending along an axis line direction of the tube rod spaced at a predetermined distance around a circumferential direction, each of said concave portions having a periphery being concave facing outwards from said portions, each of the concave portions being preliminarily formed on a circumferential wall surface of the plurally layered prepreg having a depth extending radially through at least one of the layers of the prepreg, and the golf shaft further includes a core member inserted into each of the concave portions along the axis direction and being in direct contact with an inside wall of the respective concave portion, as a strengthener in order to improve resilience thereof when the tube rod is deflected, and the golf shaft further comprises another prepreg wrapped around to cover the concave portions having the core members inserted therein from radially outward, so as to position the concave portions in an intermediate area along a thickness direction of the tube rod.

* * * * *